No. 641,029. Patented Jan. 9, 1900.
G. H. MILLEVILLE.
HAY RAKE.
(Application filed June 29, 1899.)
(No Model.)

Witnesses
T. L. McCabe
E. Horsey

Inventor
Gustav H. Milleville
By Geo. C. Shoemaker
Attorney

THE NORRIS PETERS CO., PHOTO-LITHO., WASHINGTON, D. C.

UNITED STATES PATENT OFFICE.

GUSTAVE H. MILLEVILLE, OF ALTAMONT, ILLINOIS.

HAY-RAKE.

SPECIFICATION forming part of Letters Patent No. 641,029, dated January 9, 1900.

Application filed June 29, 1899. Serial No. 722,314. (No model.)

*To all whom it may concern:*

Be it known that I, GUSTAVE H. MILLEVILLE, a citizen of the United States, residing at Altamont, in the county of Effingham and State of Illinois, have invented certain new and useful Improvements in Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hay-rakes in general, and more particularly to that class in which the hay is lifted and carried bodily to the rick or stack and there deposited either upon the ground or onto a suitable stacker.

The object of the invention is to provide a simple, cheap, and effective construction in which, when the rake is full, it may be moved readily to the rick, where by the operation of suitable mechanism the direction of travel of the teeth of the rake may be changed with respect to the direction of travel of the wheels of the machine in order that the hay may be deposited from the rake.

Figure 1:
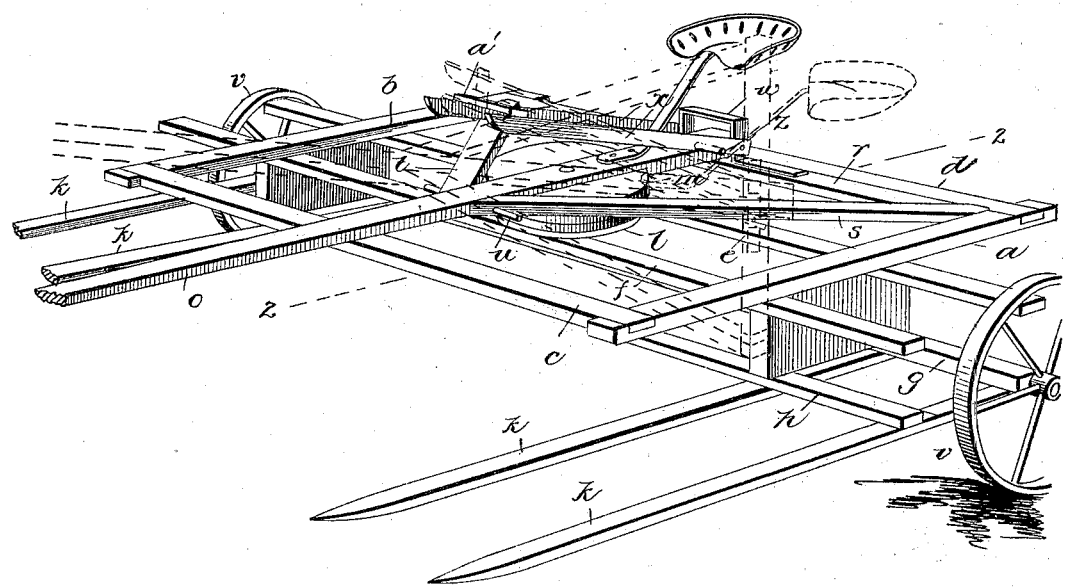
Figure 2:
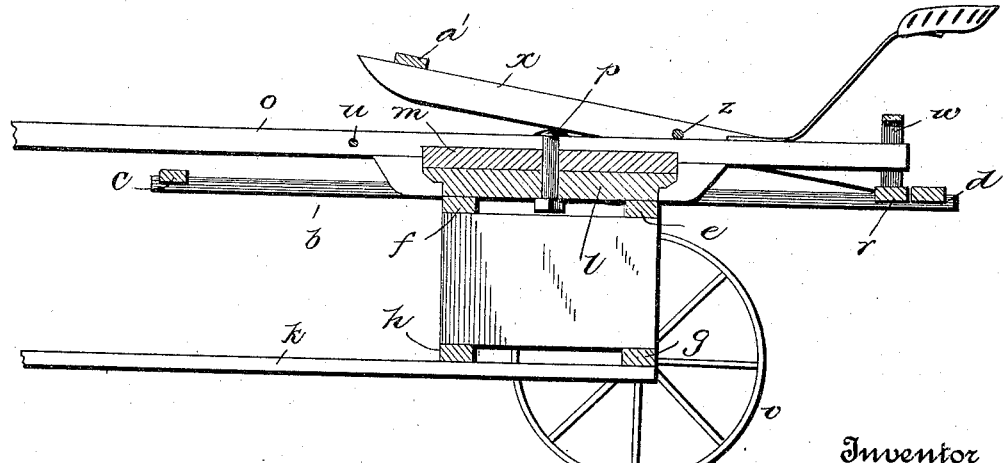

In the drawings forming a portion of this specification and in which like letters of reference indicate similar parts in both views, Figure 1 is a perspective view of a rake constructed in accordance with my invention, showing its operation in dotted lines. Fig. 2 is a longitudinal section of the rake on line 2 2 of Fig. 1.

Referring now to the drawings, in constructing a rake in accordance with my invention I form a frame comprising sides $a$ and $b$ and ends $c$ and $d$ and which frame is rectangular in plan. To the under side of the said frame are attached two parallel cross-bars $e$ and $f$, arranged below which and in alinement therewith are additional cross-bars $g$ and $h$, transversely of which last-named cross-bars are secured on their under sides a plurality of rake-teeth $k$.

Centrally of the frame comprising the sides $a$ and $b$ is fixed upon the cross-bars $e$ and $f$ one element $l$ of a fifth-wheel, adapted to cooperate with a second fifth-wheel element $m$, diametrically of the upper face of which is arranged a tongue $o$, to which latter the element $m$ is secured. A king-bolt $p$ is passed vertically through alining perforations formed contrally of the fifth-wheel elements and in the tongue.

Pivotally connected with the tongue $o$ is a triangular frame comprising a base $r$ and sides $s$ and $t$, the converging ends of which sides lie on opposite sides of the tongue $o$, said pivotal connection being made by passing a pivot-pin $u$ through alining perforations in said tongue and ends of the sides.

In order to support the base of the triangular supplemental frame above referred to, the cross-bar $e$ is positioned to receive direct pressure of the sides $s$ and $t$ of the supplemental frame, said supplemental frame having such dimensions as to enable it to fit snugly within the inclosure of the sides $a$ and $b$ and ends $c$ and $d$.

Upon the cross-bar $g$ is arranged an axle for supporting-wheels $v$, and thus when the supplemental frame is in the position shown the rake may be drawn in a direction to cause it to take up hay from the field.

If the tongue $o$ be turned in an opposite direction from that shown in Fig. 1 of the drawings, the rake will be drawn in an opposite direction, and instead of taking up hay the teeth will be drawn from under the hay and the latter will be deposited. In order to turn the tongue into the opposite position to that shown, it is necessary to lift the supplemental frame above the level of the main frame, when said supplemental frame, with the tongue, may be readily turned, and when it has reached its opposite position the supplemental frame will drop into the main frame automatically. In order to thus raise the supplemental frame, I secure to the base $r$ thereof a U-shaped strap $w$, having its outwardly-turned ends secured directly to said base, the tongue $o$ having its rear end entered within the inclosure of said strap. Pivotally connected with said strap $w$ at each side thereof and adjacent its outwardly-turned ends are two levers $x$, the pivotal connections of which are below the upper surface of the tongue. These levers extend upwardly at an angle to the upper face of the tongue and along the sides thereof and are connected above the tongue by means of a cross-bar z, which rests upon the upper surface of the tongue. The outer ends of the levers are connected by means of a pressure-plate a' in proximity to a seat upon a common form of support connected with the tongue o and in a position to enable an occupant thereof to reach the plate with his foot, and when pressure is brought to bear on said plate the cross-bar z acts as a fulcrum upon the surface of the tongue o and the rear end of the supplemental frame is raised from engagement with the main frame. By then drawing the tongue laterally, as indicated by dotted lines in Fig. 1, the supplemental frame slides around upon the main frame and when it has reached the opposite position drops automatically into place therein, locking the parts in position and enabling the machine to be drawn in an opposite direction.

It will be readily understood that I may vary the specific construction and arrangement herein shown and described and that in the manufacture of the rake I may use whatever materials may be deemed advisable for the various parts.

Having thus described my invention, what I claim is—

In a hay-rake, the combination with a rectangular frame consisting of parallel side bars connected by front and rear cross-bars; of a tongue and means for supporting, and reversing said tongue comprising a fifth-wheel consisting of a stationary member supported below the tongue, and a movable member upon which the tongue is secured; a triangular frame consisting of a transverse bar and converging sides, the ends of the latter pivoted to the tongue; a U-shaped strap secured to the cross-bar of the triangular frame, within which the end of the tongue extends; and levers pivotally secured to said strap below the upper surface of the tongue and connected by the fulcrum-rod which bears upon the upper surface of the tongue, and a pressure-plate.

In testimony whereof I affix my signature in presence of two witnesses.

GUSTAVE H. MILLEVILLE.

Witnesses:
WM. SINGLETON,
T. J. CARPENTER.